Oct. 11, 1960
B. J. DUNCAN
2,956,245
MICROWAVE ISOLATOR
Filed April 16, 1956
2 Sheets-Sheet 1
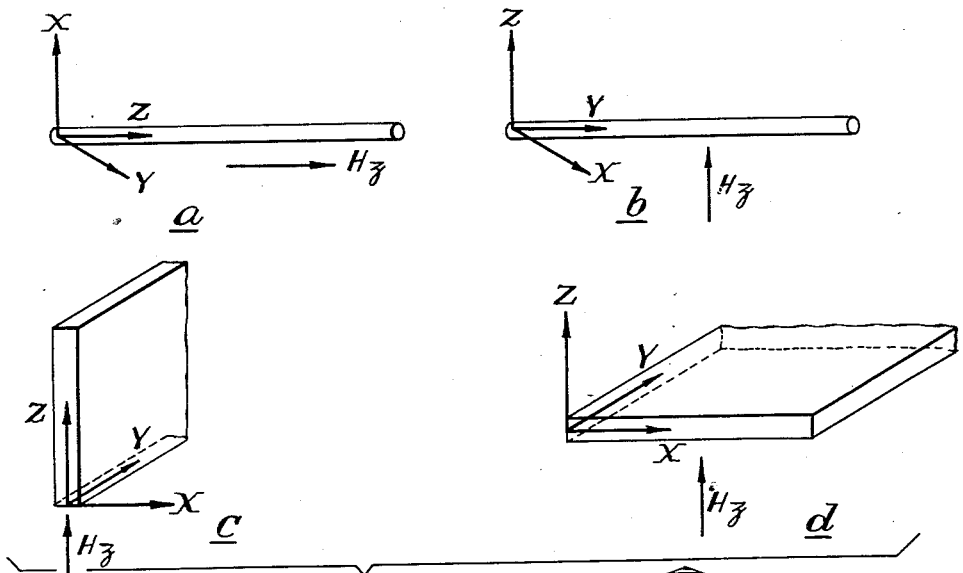
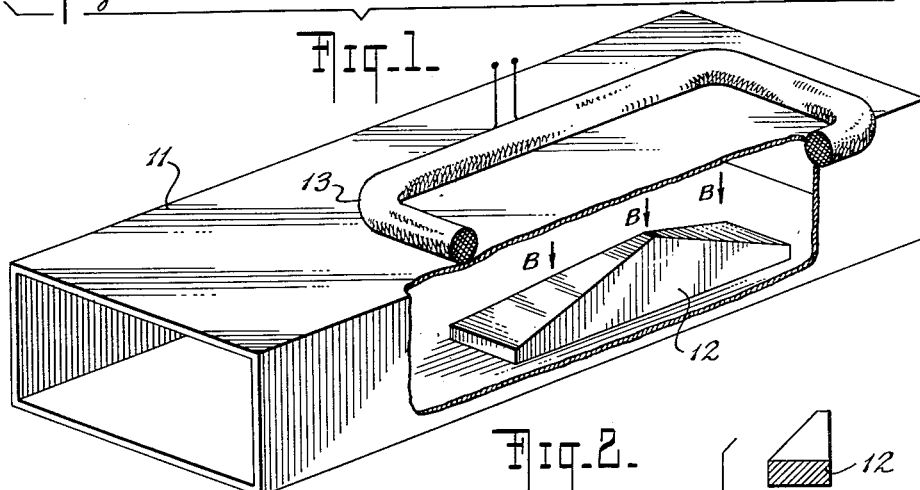
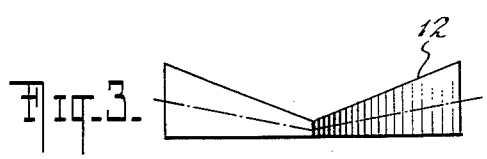
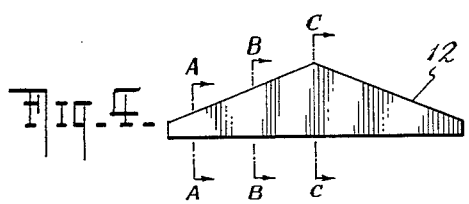
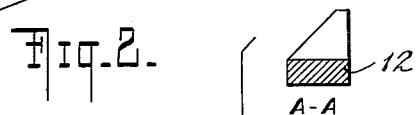
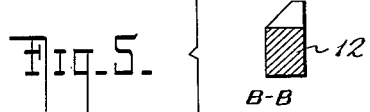
INVENTOR
BOBBY J. DUNCAN
BY
ATTORNEY Oct. 11, 1960  B. J. DUNCAN  2,956,245
MICROWAVE ISOLATOR
Filed April 16, 1956  2 Sheets-Sheet 2
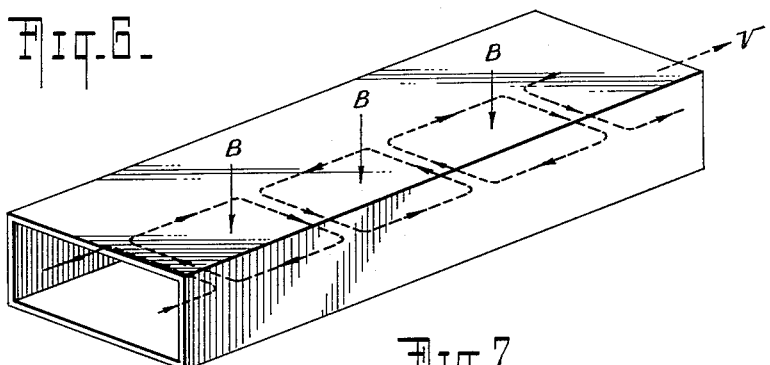
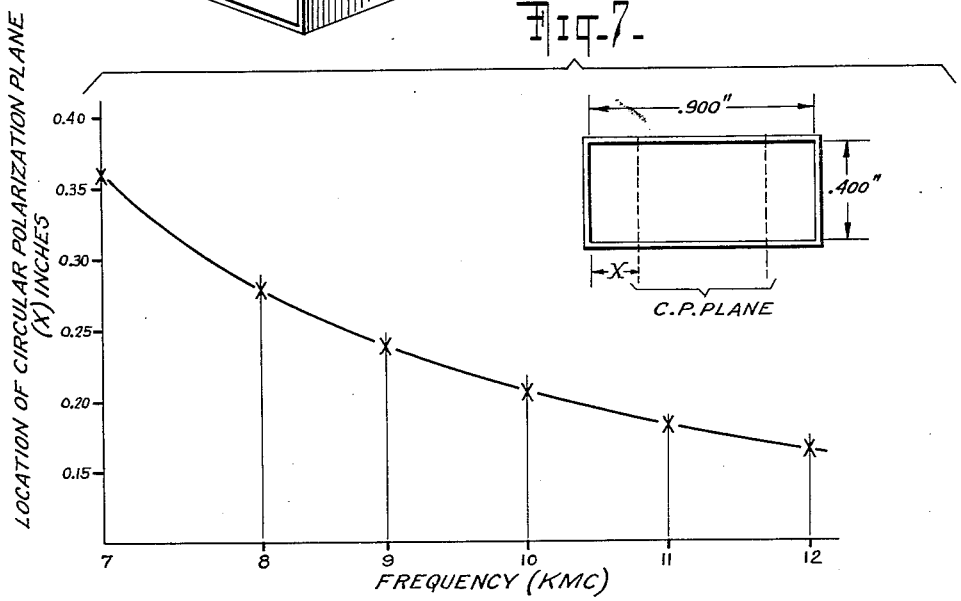
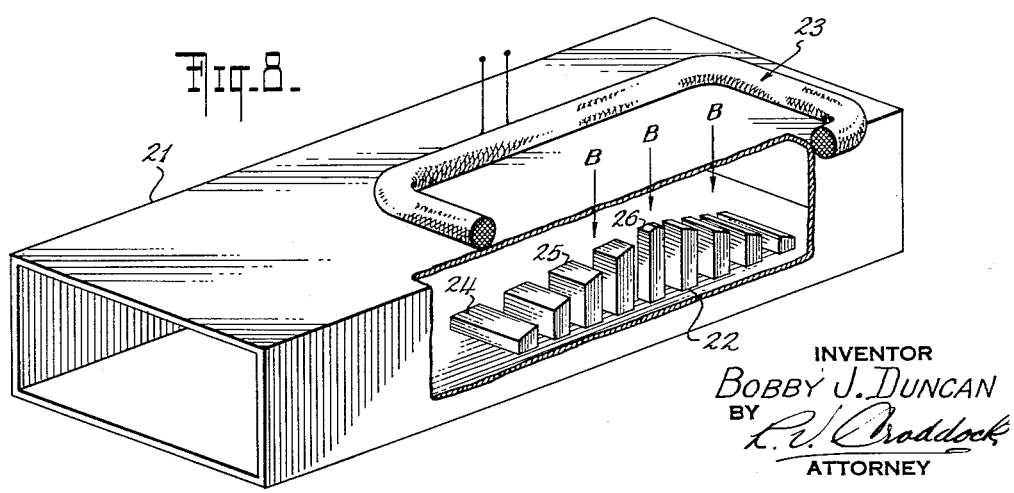
INVENTOR
BOBBY J. DUNCAN
BY
ATTORNEY

… … …

United States Patent Office 2,956,245
Patented Oct. 11, 1960

2,956,245

MICROWAVE ISOLATOR

Bobby J. Duncan, Port Washington, N.Y., assignor to Sperry Rand Corporation, a corporation of Delaware Filed Apr. 16, 1956, Ser. No. 579,421

5 Claims. (Cl. 333—24)

This invention relates to microwave transducers employing ferrites and more particularly, to unilateral transducers such as microwave isolators.

A unilateral transducer is a device which transmits energy in one direction only between two networks. An isolator is a unilateral transducer used to isolate a transmission element from reflections arising from succeeding elements. In radars and in many microwave transmission systems, a transmitting tube is coupled to a utilization means such as an antenna, through a transmission means such as a coaxial transmission line or a waveguide. A utilization means connected to a transmission means does not present a perfect match to incident electromagnetic waves and consequently, a portion of those waves will be reflected at the juncture. The combination of an incident and a reflected electromagnetic wave in a transmission means creates standing waves. The effect of such standing waves is to present to the transmitting tube an impedance which is not the characteristic impedance of the transmission means. Any change in the utilization means such as occurs in a scanning radar will be reflected to the transmitting tube as a varying impedance. This varying impedance seen by the transmitting tube will not only result in a variable amount of power being delivered to the utilization means, but may also result in "pulling" of the transmitting tube; that is, its frequency will change.

It is the function of an isolator to prevent the reflected wave from reaching the transmitting tube, but to freely permit passage of the incident wave. This may be accomplished in an isolator by providing a non-reciprocal attenuator; that is, by attenuating the reflected wave to a negligible value and allowing the incident wave to pass substantially unattenuated. In this way, the transmitting tube sees only the characteristic impedance of the transmission means regardless of changes in the utilization means. One way in which isolation has been accomplished is by the use of selective power absorption. According to the theory of gyromagnetic resonance, if an R-F magnetic field is circularly polarized in a plane perpendicular to the steady magnetization of a ferrite slab or rod, a large absorption of power occurs at that value of the magnetizing field which brings the ferrite to gyromagnetic resonance, whenever the sense of the circular polarization is positive with respect to the magnetizing field.

Circular polarization is said to be of positive sense when the R-F magnetic field rotates in a clockwise direction as seen looking in the direction of the steady magnetic field. Such resonant absorption does not occur for the negative sense of circular polarization. Thus, by placing a ferrite slab or a rod in a transmission means, such as a waveguide, wherein the magnetic field of the waves has a region of circular polarization, the device will operate as an isolator if proper values of static magnetic field are used. The static magnetic field supplied to the ferrite member must be directed in such a manner that the incident electromagnetic wave has a negative sense of circular polarization with respect to the static magnetizing field, and the reflected wave has a positive sense of circular polarization. Thus, non-reciprocal attenuation or isolation is achieved. A disadvantage of such devices, however, is the narrow frequency range over which gyromagnetic resonance occurs for a particular value of static magnetic field.

It is an object of this invention to provide an improved unilateral transducer.

It is a further object of this invention to provide an improved unilateral transducer for use in microwave circuits.

It is a further object of this invention to provide an improved microwave isolator for isolating a transmitting tube from reflections arising from succeeding elements.

It is a further object of this invention to provide an improved non-reciprocal microwave attenuator.

It is a further object of this invention to provide a device for attenuating electromagnetic waves propagating in one direction and to pass unimpeded electromagnetic waves propagating in the opposite direction.

It is a further object of this invention to provide an improved microwave isolator capable of operating over a broad range of frequencies.

It is the principal object of this invention to provide an improved gyromagnetic resonant isolator capable of operating over a broad range of frequencies.

These objects are achieved by the employment of a ferrite member disposed within a section of waveguide. In the preferred form of this invention, a source of static magnetomotive force is employed to produce a uniform magnetic field for immersing the ferrite member. The ferrite member is disposed in that region of the waveguide at which the magnetic field of the propagating wave is circularly polarized. The transverse geometrical configuration of the ferrite member tapers in a direction parallel to the waveguide axis. Thus, the gyromagnetic resonant frequency, which is a function of the transverse geometrical configuration, will not be the same for the entire ferrite member. The strength of the static magnetic field may be so adjusted that the tapered ferrite member exhibits gyromagnetic resonance to propagating electromagnetic waves over a broad range of frequencies.

The invention will be described with reference to the accompanying drawings, wherein:

Fig. 1 is a series of diagrams of various ferrite configurations useful in explaining the theory of operation of this invention;

Fig. 2 is a perspective drawing, partly in cross-section, of the preferred embodiment of the isolator of this invention;

Fig. 3 is a plan view of the ferrite member of the isolator of Fig. 2;

Fig. 4 is a side elevation of the ferrite member of the isolator of Fig. 2;

Fig. 5 illustrates cross-sections of the ferrite member of the isolator of Fig. 2;

Fig. 6 is a schematic view of the magnetic field of a $TE_{10}$ wave propagating in a rectangular waveguide section;

Fig. 7 is a graph of the location of the plane of circular polarization versus frequency for a rectangular waveguide of specified dimensions;

Fig. 8 is a perspective drawing, partly in cross-section, of an alternative embodiment of the isolator of this invention.

Ferrites can be described as polycrystalline materials of spinel structure which are formed at high temperature by the solid-phase reactions of iron oxide and one or more divalent metallic oxides. By varying the ingredients and the processing techniques, wide ranges in the general properties of ferrites can be obtained. Ferrites, in their simplest form, correspond to the general chemical formula $XOFe_2O_3$, where X represents the divalent metal. Ferrites represented by the above general formula fall into two main classes; those which are ferromagnetic and those which are not. Whether a ferrite falls into one or the other of these classes depends on the divalent metallic oxide used to make it. For example, those ferrites in which X is magnesium, copper, manganese, lithium, nickel, lead, iron, calcium, or cobalt, are ferromagnetic. The ferromagnetic ferrites are ceramic-like materials characterized by high permeability, low conductivity, low losses, and high permittivity.

It is well known that the R-F permeability of a saturated ferromagnetic material is not a scalar quantity, but instead the alternating flux density in the medium is related to the alternating field by a tensor permeability. The tensor components of the permeability are complex quantities. This unique permeability is the property of ferrites that makes them useful in the microwave art.

The ferrite's microwave permeability is due to the effect of certain electrons which behave as a group in a gyroscopic manner. The charge, mass, and spin of these electrons are associated with an angular momentum and a magnetic moment, which are those to be expected for a spinning mass and a spinning negative charge. With the application of a steady magnetic field, the axis of the electron spin becomes aligned with the direction of the steady field. If the spin axis is momentarily deflected from parallelism with the steady field, it will not return to its original position immediately, but will precess as a gyroscope about an axis parallel to the direction of the steady magnetic field. The precessional frequency is proportional to the magnitude of the steady magnetic field. This frequency is called the gyromagnetic resonant frequency. Under the influence of damping forces which exist in the solid, this precessional motion gradually ceases and the axis of the rotating electrons lines up once more with the direction of the static magnetic field. The direction of precession of the spin axis is in the direction of a positive electric current which would create the static magnetic field.

If now a component of alternating magnetic field is applied perpendicularly to the static field, the resultant magnetic vector is no longer parallel with the spin axis, and precessional motion occurs. If the applied alternating magnetic field is one that is circularly polarized in the direction of precession and if its frequency is equal to the gyromagnetic resonant frequency, the amplitude of the precessional motion will become great, and the energy of the alternating magnetic field will be absorbed by the precessing electrons. Such a wave is rotating in the positive sense. On the other hand, if the rotation of the alternating magnetic field is of the opposite sense of circular polarization, no absorption will occur and the electron will not precess. Such a wave is rotating in the negative sense.

C. Kittel in an article "On the Theory of Ferromagnetic Resonance Absorption," Physical Review, volume 73, No. 2, January 15, 1948, pages 155-161, has shown that the gyromagnetic resonant frequency is dependent on the shape of the ferrite specimen. This dependency is related to the nature of the demagnetizing field, which in turn depends on the shape of the specimen. The general case of magnetic resonant frequency is thus given by $$\omega_0 = \gamma\{[H_z + (N_y - N_z)M_z] \times [H_z + (N_x - N_z)M_z]\}^{1/2} \quad (1)$$

where $\omega_0 = 2\pi f_0$ and $f_0$ is the gyromagnetic resonant frequency, $\gamma$ is the magneto-mechanical ratio for an electron spin;

$$\frac{\gamma}{2\pi} = 2.80 \frac{mc.}{oersted}$$

$H_z$ is the value of the static magnetic field, which is always directed in the z direction for purposes of this equation. The z direction corresponds to a direction perpendicular to the plane of the alternating magnetic field circular polarization;

$N_x$, $N_y$, $N_z$ are the demagnetizing factors, the sum of which equals $4\pi$. Demagnetization factors are factors which define a demagnetizing field in the ferrite specimen which opposes the externally applied steady magnetic field. The demagnetizing field results from the induction near the surface of the ferrite specimen of magnetic poles which are not aligned with the direction of the external steady magnetic field.

$M_z$ is the saturation magnetization of the ferrite, and depends on the ferrite composition. Saturation magnetization defines the intensity of the steady magnetic field required to align the magnetic moments of the spinning electrons in a direction parallel to the direction of the steady magnetic field.

Upon applying Equation 1 to various geometrical configurations of ferrite materials, the change in gyromagnetic resonant frequency may be illustrated. In Fig. 1, wherein $H_z$ represents the applied static magnetic field, two geometrical configurations are illustrated. In Fig. 1a, the static magnetic field is applied parallel to the axis of a long thin rod whose diameter is small compared to a wavelength in the ferrite medium. For this configuration and direction of applied field, $N_x = N_y = 2\pi$; $N_z = 0$, and $$\omega_0 = \gamma[H_z + 2\pi M_z] \quad (2)$$

In Fig. 1b, the static magnetic field is applied transversely to the axis of the rod. For this situation $N_x = N_z = 2\pi$; $N_y = 0$, and $$\omega_0 = \gamma[H_z(H_z - 2\pi M_z)]^{1/2} \quad (3)$$

In Fig. 1c, a thin ferrite slab is used, in which the slab thickness is small compared to a wavelength in the ferrite, and to the width and length of the ferrite sample. The magnetic field is applied parallel to the narrow dimension of the slab face. For this case, $N_y = N_z = 0$; $N_x = 4\pi$, and $$\omega_0 = \gamma[H_z(H_z + 4\pi M_z)]^{1/2} \quad (4)$$

In Fig. 1d, the static magnetic field is applied perpendicularly to the face of a thin ferrite slab. For this situation, $N_x = N_y = 0$; $N_z = 4\pi$, and $$\omega_0 = \gamma[H_z - 4\pi M_z] \quad (5)$$

Thus, it is seen that ferrite materials of different geometrical configurations may have different gyromagnetic resonant frequencies. These equations also show that different values of static magnetic field and different values of saturation magnetization result in different gyromagnetic resonant frequencies.

As has been pointed out, ferrite materials will exhibit gyromagnetic resonance to electromagnetic waves traveling in one direction with one sense of circular polarization, and will thus attenuate these waves, but will not substantially affect waves traveling in the opposite direction, as these waves have the opposite sense of circular polarization. The amount of attenuation due to gyromagnetic resonance is proportional to the length of the ferrite material exposed to the waves along their direction of travel. Consequently, to achieve the desired degree of isolation, that is, to reduce the reflected wave to a negligible value or to less than a predetermined value it is necessary to use a ferrite member of sufficient length. Where the isolator is to operate over a broad frequency range, each region which is gyromagnetically resonant over a different portion of this range must be made sufficiently long to reduce the reflected or attenuated wave to a value less than a predetermined maximum value.

In Fig. 2, a rectangular waveguide section 11 is employed to transmit electromagnetic waves between a transmitting tube and a utilization means. A ferrite member 12, properly oriented within waveguide section 11, operates to permit passage of the incident electromagnetic waves without attenuation, but to prevent transmission of the reflected waves. A source of magnetic field, such as a solenoid 13, connected to a source of direct current, not shown, supplies a uniform magnetic field B directed perpendicularly to the broad walls of waveguide section 11 for immersing ferrite member 12. As shown in Figs. 3, 4, 5, the geometrical configuration of ferrite member 12 in a plane perpendicular to the axis of waveguide section 11 changes gradually in a direction along the axis. Thus, as shown at section A—A, the configuration of ferrite member 12 is a rectangle having its major axis parallel to the broad wall of waveguide section 11. At C—C, the transverse geometrical configuration of ferrite member 12 is a rectangle having its major axis perpendicular to the broad wall of waveguide section 11. Between sections A—A and C—C, the transverse geometrical configuration of ferrite member 12 changes smoothly. At section A—A, member 12 simulates a flat slab immersed in a static magnetic field perpendicular to the face thereof, as in Fig. 1d. At section C—C, ferrite member 12 represents a flat slab magnetized parallel to its broad dimensions, as in Fig. 1c.

Instead of the above ferrite shaping, the ferrite member may be of uniform material and cross-section, but with the value of the static magnetic field changing in a direction along the axis. Isolation is also achieved by employing a ferrite member having discrete sections composed of different materials to achieve differing saturation magnetizations. Furthermore, any combination of these three methods might properly be employed to achieve broad banding. However, the employment of a ferrite having sections of different shape is preferred in the present state of the art—first, due to the difficulty of obtaining an accurate non-uniform magnetic field and secondly, due to the difficulty of obtaining materials of proper characteristics to cover the band of frequencies desired. In the preferred method the desired bandwidth is achieved by the simple process of mechanically shaping the ferrite member.

In order for this device to act as a gyromagnetic resonant isolator, it is necessary that ferrite member 12 be disposed in a region where the magnetic field of the wave is circularly polarized. The magnetic field configuration for a $TE_{10}$ wave propagating in rectangular waveguide is shown schematically in Fig. 6. In the $TE_{10}$ mode the magnetic field is in the form of loops which lie in planes parallel to the broad wall of the waveguide section. If the wave is propagating in the direction shown, to an observer looking down on the top broad wall of the waveguide in a region near the right narrow wall, the magnetic field vectors in that region appear to be rotating in the positive sense. Resonant absorption will occur for such a wave. On the other hand, resonant absorption will not occur for a wave rotating in the negative sense. For a wave, traveling in the opposite direction, a negative sense of rotation will be viewed looking down on the waveguide section near the front narrow wall. Thus, by placing a ferrite member in this region of circular polarization, resonant isolation is achieved.

It is necessary, therefore, that ferrite member 12 of Fig. 2 be placed in a region of circularly polarized magnetic field. However, the location of the region of circular polarization depends on the frequency of the propagating wave, as shown in Fig. 7. From Equations 4 and 5, which indicate the gyromagnetic resonant frequency for those portions of member 12 shown respectively at sections C—C and A—A, it is seen that the resonant frequency for section A—A is lower than that for section C—C and, consequently, section A—A must be disposed nearer the center line of waveguide section 11 than section C—C. Consequently, section A—A is disposed with its midpoint in the region of circular polarization for the frequency at which it is to exhibit gyromagnetic resonance to the incident wave, and section C—C is disposed with its midpoint in the region of circular polarization for the frequency at which it is to exhibit gyromagnetic resonance. Thus, the center line of the cross-section of member 12 viewed as in Fig. 3 is not parallel to the axis, but is nearer the narrow wall of waveguide section 11 for cross-section C—C. Regardless of the method employed to obtain the wide range of gyromagnetic resonant frequencies, the individual regions of differing resonant frequencies should be located to coincide with the location of the regions of circular polarization corresponding to those frequencies.

In order that accurate predictions of the resonant frequencies of the representative cross-sections may be realized, it is preferable that the ratio of the major to the minor axes of the rectangles represented at sections A—A and C—C be approximately 5-to-1 or greater.

As an example of the broad range of frequencies over which this isolator will perform, an isolator was constructed having an applied magnetic field $H_z=4500$ oersteds and a ferrite member composed of Ferramic R-1 material, a product of the General Ceramics Corporation. For this material $4\pi M_z=1700$ oersteads. The ferrite member was shaped as in Figs. 2, 3, 4, 5 and disposed as shown in a rectangular waveguide. The dimensions were:

| | |
|---|---|
| Waveguide I.D. | —0.9" x 0.4" |
| Ferrite section A—A | —0.165" x 0.035" |
| Ferrite section C—C | —0.150" x 0.035" |
| Distance from waveguide narrow wall to nearest ferrite surface | —0.165" |
| Length | —3.0" |

*Electrical characteristics for frequency range*

[7.5–11.0 kilomegacycles (kmc.)]

Forward wave attenuation—
  Minimum _____ —0.9 db at 7.5 kmc.
  Maximum _____ —2.5 db at 11.0 kmc.
Backwave wave attenuation—
  Minimum _____ —6.0 db at 11.0 kmc.
  Maximum _____ —8.8 db at 7.5 kmc.

Although member 12 is shown as tapering at both ends to a rectangular cross-section of the type of section A—A, a design that is desirable for matching purposes, this dual taper is not necessary to the operation of this invention. Instead, the ferrite member need only taper between cross-sections of those of section A—A and section C—C in order to be operative over the specified frequency range.

An alternative embodiment of this invention is shown in Fig. 8. Disposed within a rectangular waveguide section 21 is a ferrite member 22 which is immersed in a transverse magnetic field supplied by a source of magnetic field, such as solenoid 23. Ferrite member 22 has a geometrical configuration in a plane perpendicular to the waveguide axis that tapers in a direction along the axis much in the same manner as the taper of ferrite member 12. However, ferrite member 22 is composed of a plurality of slices, such as the slices 24, 25, 26. Each slice may be mounted within waveguide section 22, by affixing to a broad wall of the waveguide section. Among the advantages of this type of structure of the ferrite member are those of ease of removing dissipated power; that is, it is relatively simple to pump a gaseous coolant between the faces of the slices and thereby remove the power dissipated by the reflected wave. Another advantage is that more precise computation of the resonant frequencies may be realized, as the individual sections more closely approximate the specific sections of Fig. 2. For example, slice 24 is a ferrite rod magnetized transversely to its axis and, thus, is the type of Fig. 1b. On the other hand, slice 26 is a ferrite rod magnetized parallel to its axis, and is the type of Fig. 1a. Computing the range of gyromagnetic resonant frequencies for this structure, using the same material and the same uniform magnetic field as was described previously, it is found that the gyromagnetic resonance frequencies at which this device will operate occupy the frequency range of 11,100 to 14,800 megacycles.

This invention is not restricted to the employment of rectangular waveguides as the vehicle for the transmission of the electromagnetic waves. Any electromagnetic wave transmission means which propagates waves in a field mode wherein at least a portion of the magnetic fields are circularly polarized may be utilized. For example, circular waveguide and certain types of strip lines are useful for the purposes of this invention.

Furthermore, although this invention has been described with reference to its employment as an isolator, it will work equally well as a broadband attenuator. Thus, by placing the ferrite member in a region of linearly polarized waves, bilateral broadband attenuation is achieved.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A microwave transducer comprising a rectangular waveguide section adapted to propagate transverse electric electromagnetic waves within a given range of frequencies, a plurality of ferrite elements longitudinally disposed within said waveguide section and positioned transversely to the longitudinal axis of said section, said elements having progressively decreasing widths and progressively increasing heights in the same direction along substantially their entire longitudinal extent, whereby said elements when immersed in a steady magnetic field are characterized by each having demagnetization factors which differ in value from those of the other elements, and a magnetic field source disposed to immerse said ferrite elements in a steady magnetic field directed perpendicularly to a broad wall of said waveguide section, said magnetic field being of such intensity as to magnetically bias different ferrite elements to gyromagnetic resonance for waves at respective different frequencies propagating in a given direction in said waveguide section.

2. A microwave transducer comprising a rectangular waveguide section adapted to propagate transverse electric electromagnetic waves within a given range of frequencies, an elongated ferrite member disposed within said waveguide section and extending parallel to the longitudinal axis of said section, said member having a progressively decreasing width and a progressively increasing height in the same direction along substantially its entire length, whereby said member when immersed in a steady magnetic field is characterized by having demagnetization factors of different values at spaced regions along its length, and a magnetic field source disposed to immerse said ferrite member in a steady magnetic field directed perpendicularly to a broad wall of said waveguide section, said magnetic field having the correct intensity to magnetically bias different longitudinally spaced portions of said ferrite member to gyromagnetic resonance for waves at respective different frequencies propagating in a given direction in said waveguide section.

3. In combination, a hollow conductive waveguide section for propagating electromagnetic waves within a given range of frequencies along an axis, said waves propagating in a mode wherein the magnetic fields of the waves are circularly polarized in regions which extend parallel to said axis and wherein the lateral distances between said regions and said axis are a function of the frequencies of said waves, an elongated ferrite member disposed in said waveguide in a region where waves propagating in a given direction are circularly polarized in a positive sense of rotation, the geometrical configuration of said member in first and second longitudinally spaced planes disposed perpendicularly to said axis being respectively first and second rectangles having their major axes parallel, the geometrical configuration of said ferrite member in a third plane perpendicular to said axis and intermediate said first and second planes being a third rectangle having its major axis rotated through 90° with respect to said major axes of the first and second rectangles, and means for immersing said ferrite member in a steady magnetic field of the correct strength to magnetize different longitudinally spaced portions of said member to gyromagnetic resonance for positive circularly polarized waves at respective different frequencies propagating in said waveguide section, said steady magnetic field being directed perpendicularly to said axis, said portions of the ferrite member having different gyromagnetic resonance frequencies being laterally positioned in said waveguide with their respective midpoints substantially coinciding with the position of the region of circular polarization of waves at a corresponding frequency.

4. A microwave transducer comprising a rectangular waveguide for propagating electromagnetic waves within a given range of frequencies in a transverse electric mode wherein the magnetic fields of said waves are circularly polarized in regions which extend parallel to the longitudinal axis of said waveguide and wherein the lateral distances between the longitudinal axis of said waveguide and said regions are a function of the frequency of the respective waves, an elongated ferrite member disposed in said waveguide on a transverse side of said axis where the magnetic fields of waves propagating in one direction are circularly polarized in a positive sense of rotation, said member extending parallel to said axis and having a progressively decreasing width and a progressively increasing height in the same direction along substantially its entire length, whereby said member when immersed in a steady magnetic field is characterized by having demagnetization factors of different values at different sections spaced along its length, and means for immersing said ferrite member in a steady magnetic field of such strength as to magnetize each one of said sections to gyromagnetic resonance for waves at a respective different frequency within said range of frequencies, said sections of the ferrite member having different gyromagnetic resonance frequencies being laterally positioned in said waveguide with their respective midpoints substantially coinciding with the position of the region of circular polarization of waves at a corresponding frequency.

5. A microwave transducer comprising a waveguide for propagating electromagnetic waves within a given range of frequencies in a transverse electric mode wherein the magnetic fields of said waves are circularly polarized in respective regions which extend parallel to the longitudinal axis of said waveguide and wherein the lateral distances between said axis and said regions are a function of the frequencies of said waves, an elongated ferrite member disposed in said waveguide in a position where the magnetic fields of waves propagating in one direction are circularly polarized in a positive sense of rotation, said member having a progressively decreasing width and a progressively increasing height in the same direction along substantially its entire length, whereby said ferrite member when immersed in a steady magnetic field is characterized by having demagnetization factors of different values at different sections spaced along said portion of its length, and means for immersing said ferrite member in a steady magnetic field directed perpendicularly to said axis, said steady magnetic field having the correct strength to magnetically bias each one of the different sections of said ferrite member to gyromagnetic resonance for positive circularly polarized waves at a respective different frequency in said range of frequencies, the midpoints of the sections of said ferrite member which are gyromagnetically resonant for waves at the highest frequencies being disposed furthest from the longitudinal axis of said waveguide.

References Cited in the file of this patent

UNITED STATES PATENTS

| | | |
|---|---|---|
| 2,745,069 | Hewitt | May 8, 1956 |
| 2,776,412 | Sparling | Jan. 1, 1957 |
| 2,798,205 | Hogan | July 2, 1957 |
| 2,806,972 | Sensiper | Sept. 17, 1957 |
| 2,849,684 | Miller | Aug. 26, 1958 |

OTHER REFERENCES

Kales et al.: "A Nonreciprocal Microwave Component," Journal of Applied Physics, vol. 24, No. 6, June 1953, pages 816–17.

Fox et al.: Bell System Technical Journal, vol. 34, No. 1, January 1955, pages 5–103.